July 14, 1964 W. HAUER 3,140,767

HIGH SPEED AUTOMATIC MAIL SORTING SYSTEMS

Filed Aug. 20, 1962 10 Sheets-Sheet 1

INVENTOR.
WERNER HAUER
BY Isidore Togut
ATTORNEY

July 14, 1964 W. HAUER 3,140,767

HIGH SPEED AUTOMATIC MAIL SORTING SYSTEMS

Filed Aug. 20, 1962 10 Sheets-Sheet 2

INVENTOR.
WERNER HAUER
BY Isidore Togut
ATTORNEY

July 14, 1964 W. HAUER 3,140,767

HIGH SPEED AUTOMATIC MAIL SORTING SYSTEMS

Filed Aug. 20, 1962

10 Sheets-Sheet 3

INVENTOR.
WERNER HAUER
BY Isidore Togut
ATTORNEY

INVENTOR.
WERNER HAUER
BY Isidore Togut
ATTORNEY

INVENTOR.
WERNER HAUER
BY Isidore Togut
ATTORNEY

July 14, 1964 W. HAUER 3,140,767
HIGH SPEED AUTOMATIC MAIL SORTING SYSTEMS
Filed Aug. 20, 1962 10 Sheets-Sheet 6

INVENTOR.
WERNER HAUER
BY Isidore Togut
ATTORNEY

INVENTOR.
WERNER HAUER
BY Isidore Togut
ATTORNEY

INVENTOR.
WERNER HAUER
BY Isidore Togut
ATTORNEY

INVENTOR.
WERNER HAUER
BY Isidore Togut
ATTORNEY

INVENTOR.
WERNER HAUER

BY Isidore Togut
ATTORNEY 3,140,767

HIGH SPEED AUTOMATIC MAIL SORTING SYSTEMS

Werner Hauer, Nutley, N.J., assignor to International Telephone and Telegraph Corporation, Nutley, N.J., a corporation of Maryland Filed Aug. 20, 1962, Ser. No. 218,029
23 Claims. (Cl. 198—1)

This invention relates to systems for selectively handling and dispensing a plurality of articles and more particularly to high-speed systems for sorting mail.

In mail distribution and sorting systems individual letters are usually carried either by a conveyor belt or by a container. Several versions of conveyor systems are known and operate satisfactorily in the low capacity range. In the high capacity range, techniques employing containers are preferable. This is so as synchronization and separation are easier to accomplish with the use of containers and many mail switching problems are avoided.

Container sorting machines have certain technical limitations due to the fact that the mail varies in weight and stiffness and there is undesired adhesion caused by static electricity between some of the mail pieces and the containers holding them. These limitations have forced designers to oversize the container dimensions for thickness and to limit the operation speed to the longest possible unloading time of light-weight mail. The width of the average container is approximately one-inch. The containers must be arranged a minimum distance apart when they are connected to conveyors in order to insure clearance between the containers while transversing loops at the conveyor ends. This clearance distance is usually about one and one quarter inches, therefore, approximately two and one quarter inches of the conveyor belt is required per article of mail. Approximately 12% of the active part of the conveyor is utilized employing container techniques and less than 10% of the active conveyor is employed utilizing conveyor belt techniques. Utilizing my invention, approximately 90% of the active conveyor is employed. The active part of a conveyor is the part which can convey articles as distinct from the part which is employed in the machinery or on its return path.

It is therefore an object of this invention to provide mail sorting systems employing conveyors which utilize nearly all of the active conveyor sections.

It is another object of this invention to provide a system for handling mail in which the technical difficulties of different weight, size, thickness, and flexibility of mail are avoided.

It is a further object of this invention to provide a high-speed system for selectively handling and positively dispensing articles.

It is still another object of this invention to provide means for identifying articles of mail without requiring the use of any identifying indicia on the article of mail itself.

Another object of this invention is to provide novel article holding and dispensing devices which will allow sandwiching of the holding devices so as to permit maximum utilization of the transporting means employed.

Another object of this invention is to provide an article holding device which eliminates friction between the article held and the holding device when the article is inserted, transported, or dispensed.

It is still another object of this invention to provide means for transporting holding devices which will permit the holding devices to function without requiring removal from said transporting means.

My invention relates to systems using a conveyor pocket made of plastic. Any number of pockets may be assembled as a unit and contained in a tray. The tray has a coding bar for each pocket on which the destination of the article, mail in this example, in the pocket is encoded. The loading of the mail into the pockets is performed off-line at coding desks at a moderate rate. The filled trays are carried by conveyors to a sorting machine for letter sorting and ejection. There the trays, in an upside down position, pass receiver bins. Each receiver position is equipped with a set of sensors for reading the destination code on the memory rods and each set of sensors has a specific destination code assigned to it. In the event of code coincidence, an actuator is operated to strike a driver of the particular pocket into a "marked" position. The driver of the "marked" pocket is thus caused to engage an inclined plane due to the movement of the conveyor. As the tray moves laterally past the plane, the contained letter is ejected into the receiver bin associated with that plane.

This conveyor-pocket technique is applicable to any system concept. It can be used for any type and any size of sorting machine. It is a unique slow conveyor speed, high capacity sorting system and is made possible by an extremely high packing density, which permits the conveyor speed for the conveyor to stay within reasonable values, well below 120 feet per minute, a speed considered the upper limit for safe operation of controlled conveyors.

It is implicit that an improvement in capacity and speed is only useful as long as the operative reliability is improved to the same degree. This requirement has been achieved by the introduction of the concept of positive ejection. Weight, friction, static adhesion, and mail consistency are eliminated as disturbing influences in the ejection process.

A feature of this invention is the provision of a high-speed system for selectively sorting articles which are held in holding devices having variable depth pockets. Trays are provided for carrying the devices. The tray contains means for identifying the destination of the articles without actually using the articles themselves upon which to place their destination. Conveyors transport the trays to destination stations. Means responsive to the destination information of the articles selectively cause the depths of the pockets to be varied and eject the articles held by the holding devices.

Another feature of this invention is a mail sorting system employing conveyors upon which the mail is densely packed whereby a slow conveyor speed high capacity sorting system is provided.

Another feature of this invention is a holding device having movable walls so as to prevent friction between articles inserted, held, or ejected by the device.

A further feature of this invention is a holding device having a pocket which sandwiches inserted articles and can hold the articles while it is in its normal or inverted position.

Another feature of this invention is a tray carrying the holding devices in which the devices function completely without requiring removal from said tray.

The above-mentioned and other features and objects of this invention will become more apparent by reference to the following description taken in conjunction with the accompanying drawings, in which.

Figures 3, 4, 20:
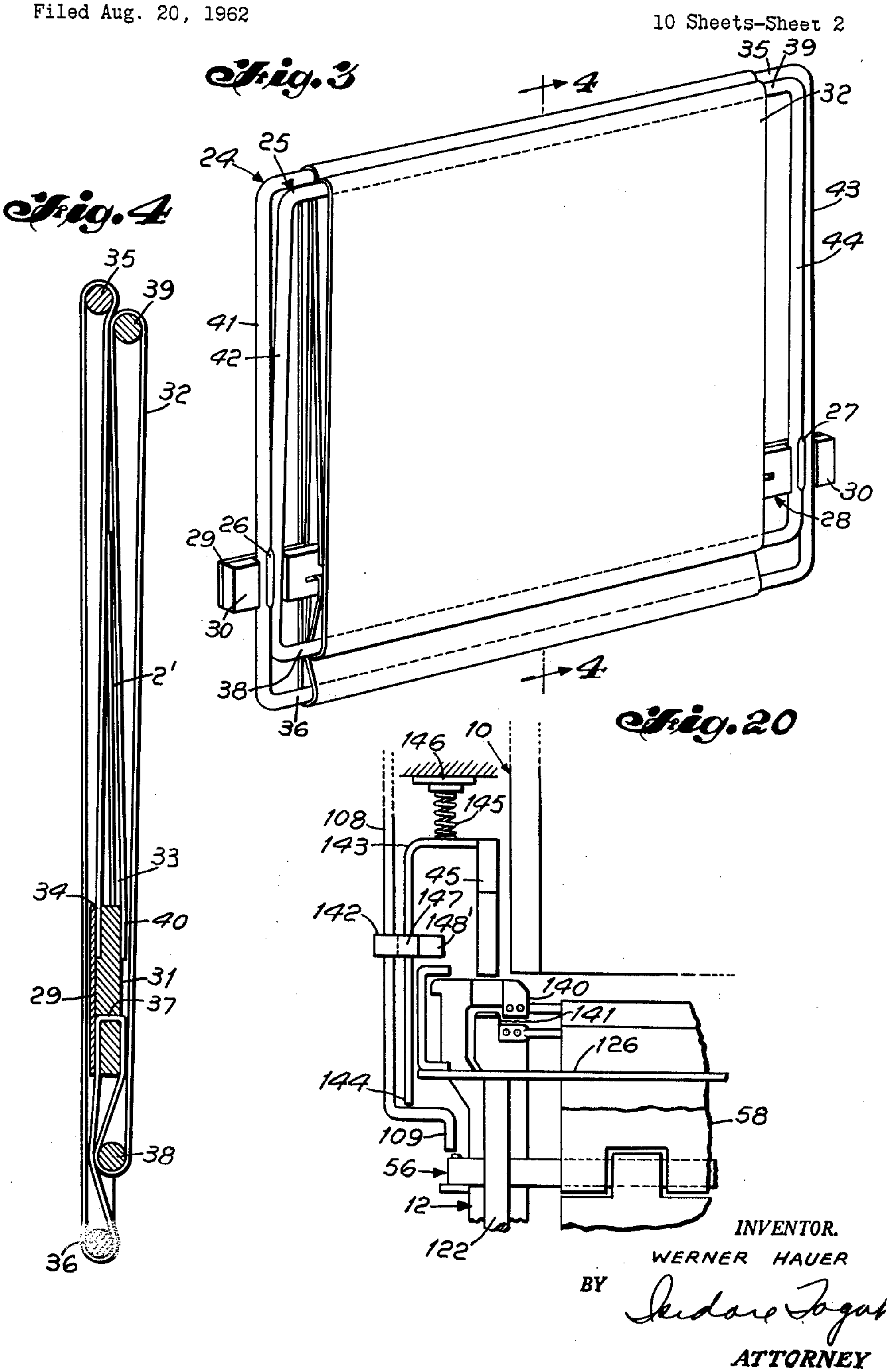
FIGURE 3 is a perspective view of a holding device in accordance with my invention.
FIGURE 4 is a cross-sectional view of the holding device of FIGURE 3 taken along the lines 4—4.
Figure 9:
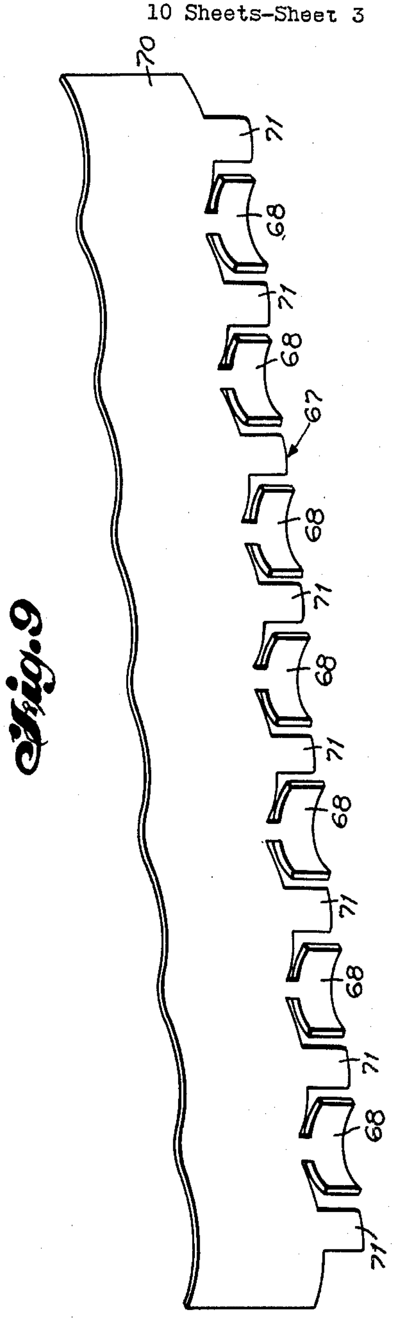
Figure 6:
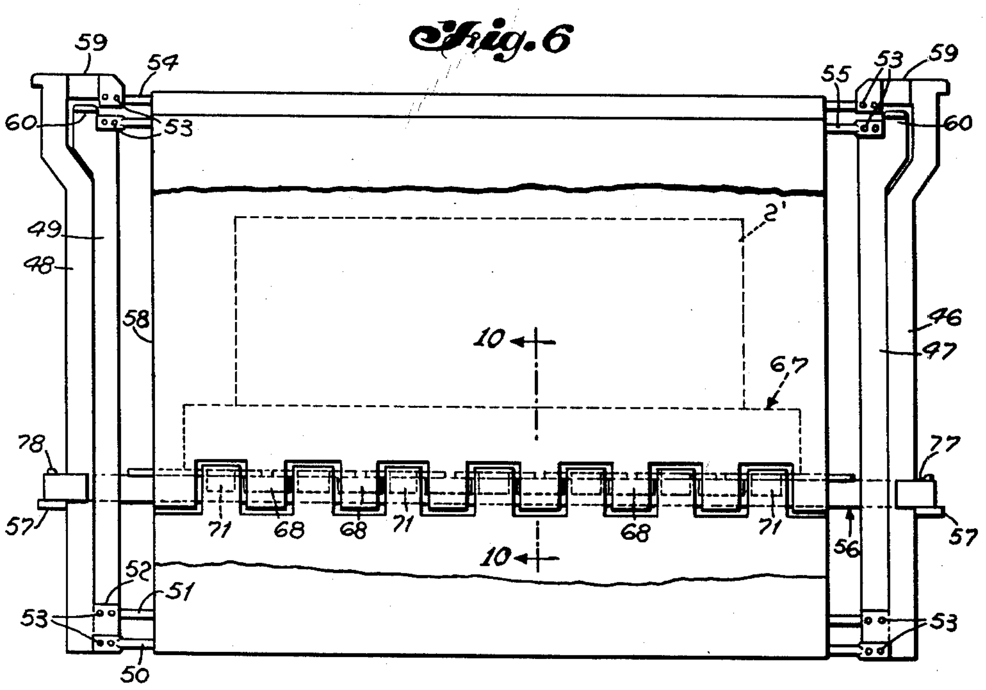
Figure 7:
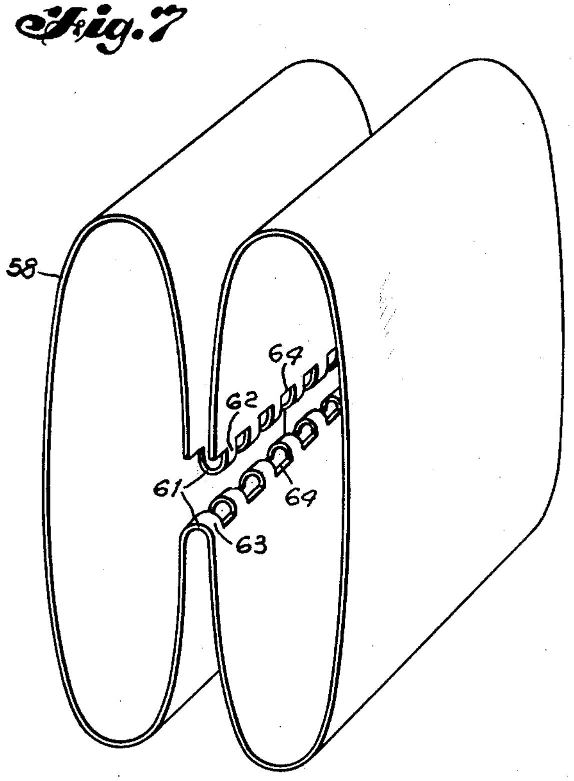
Figure 10:
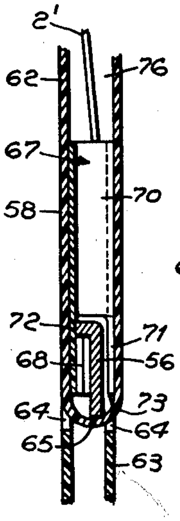
Figure 8:
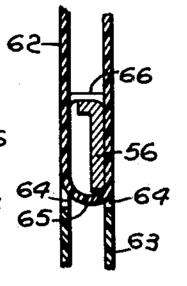
Figures 11, 13:
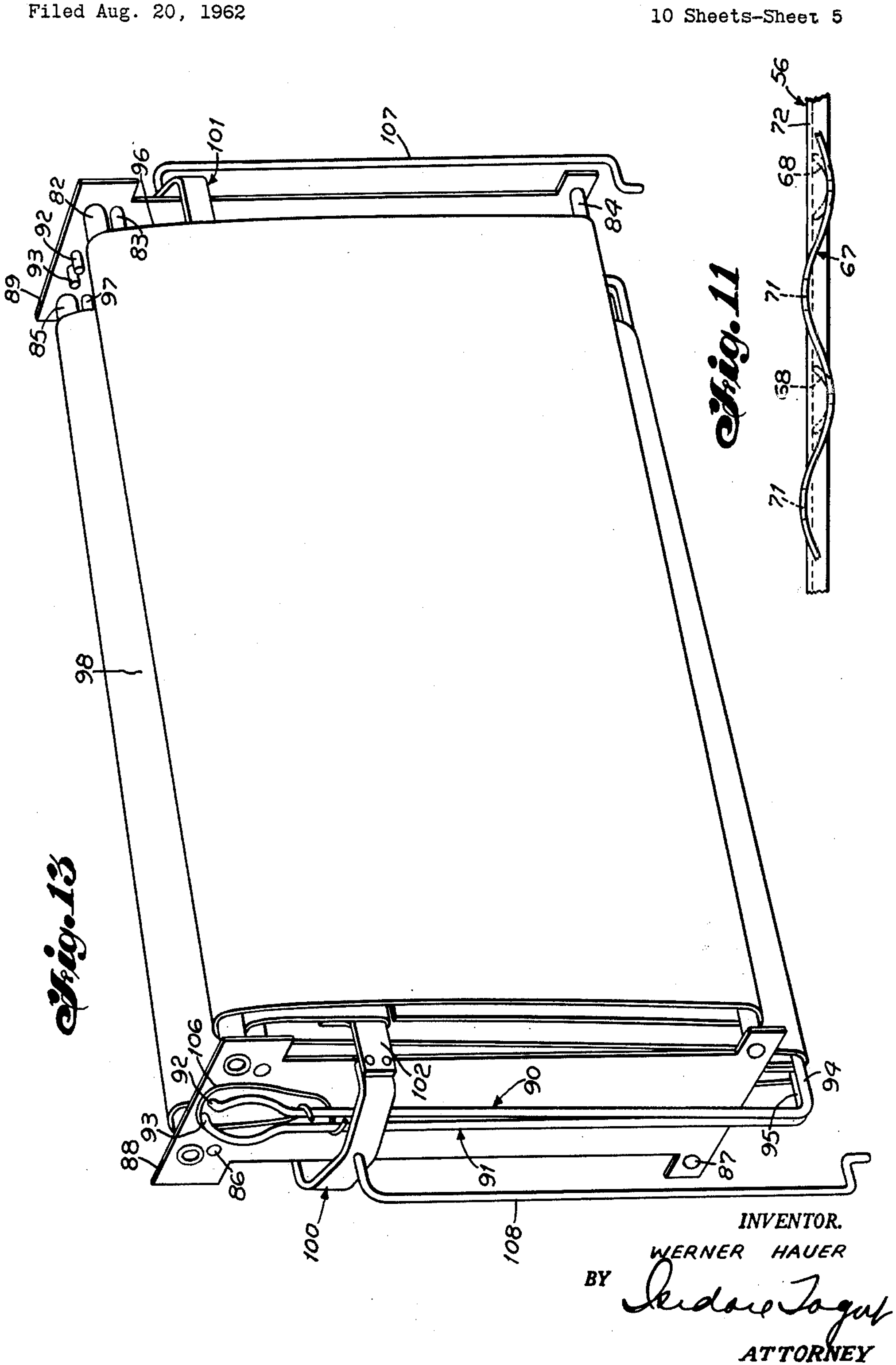
Figures 12, 16, 17:
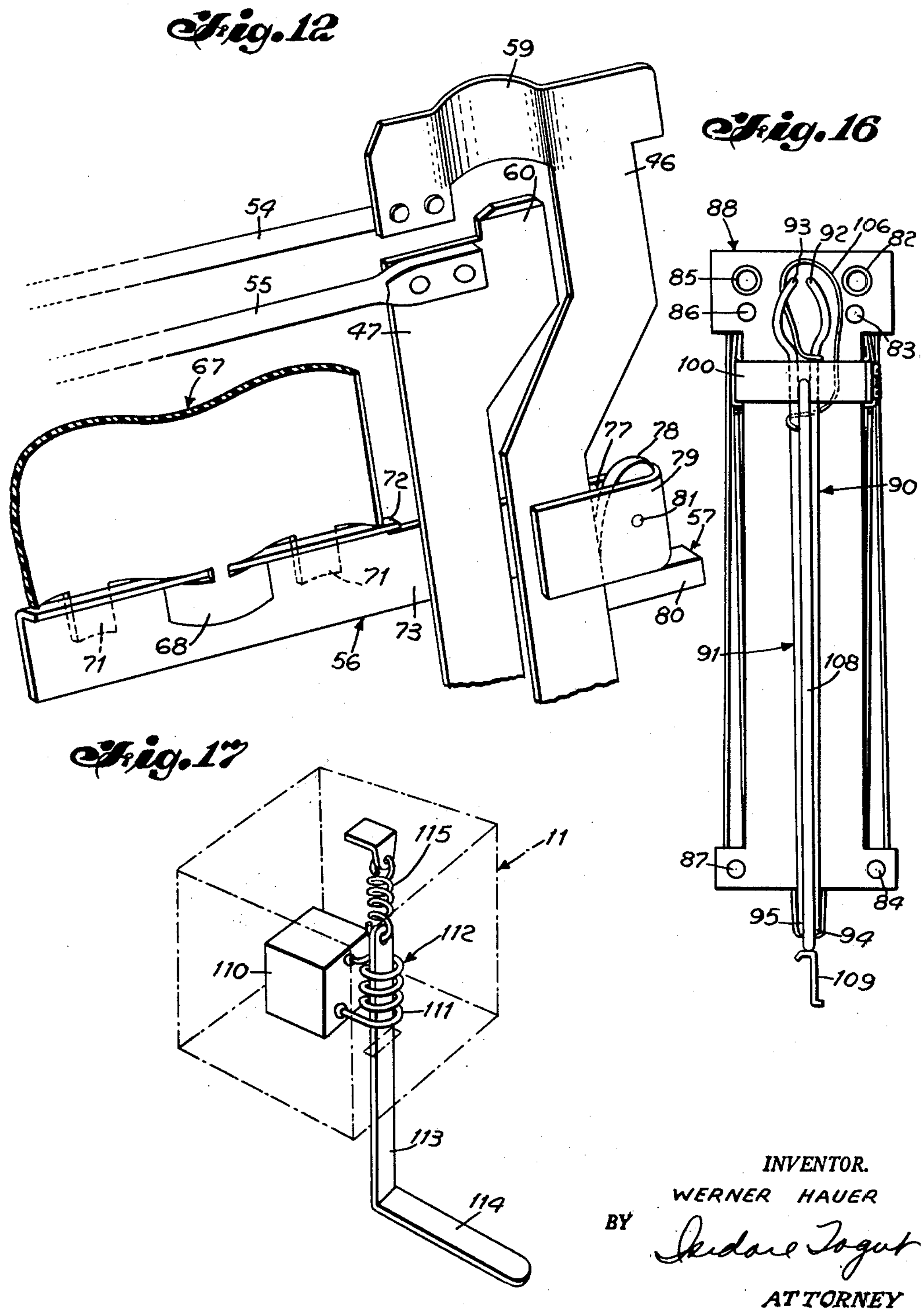
Figures 14, 22:
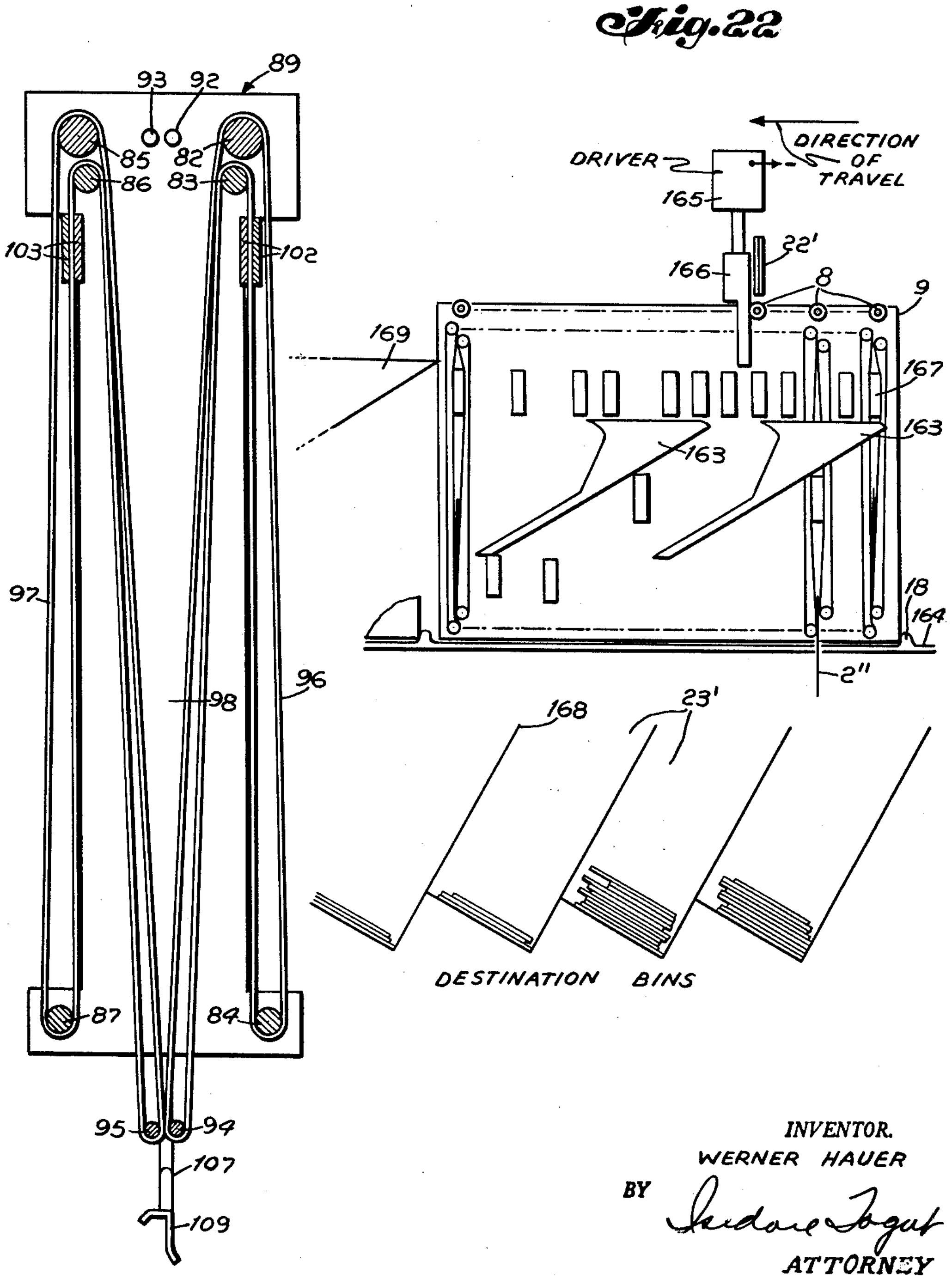
Figure 15:
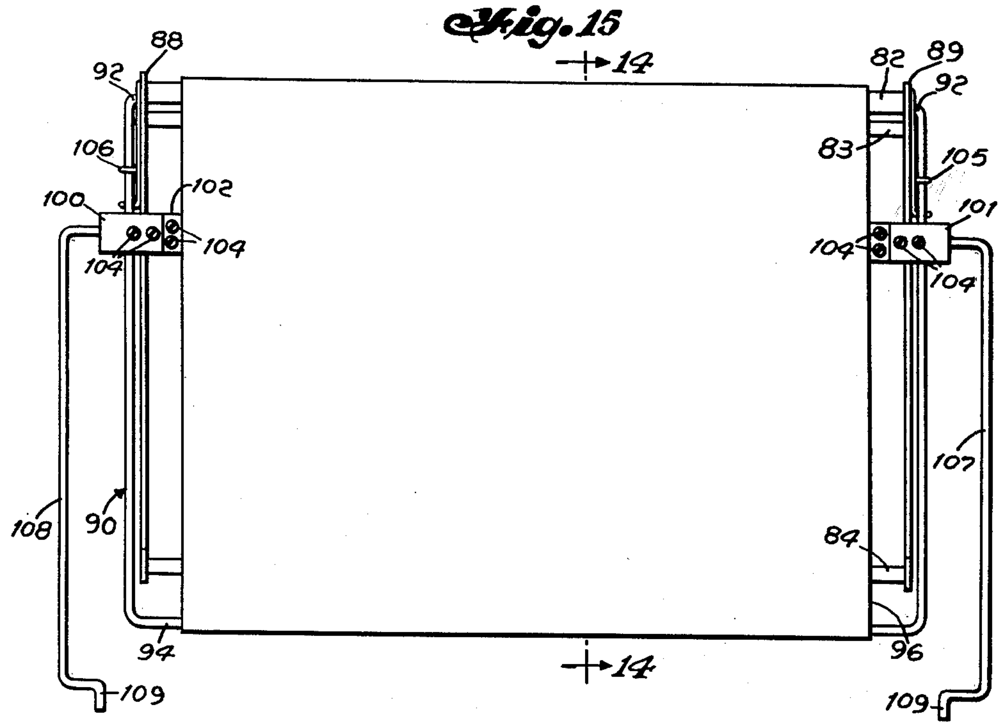
Figure 21:
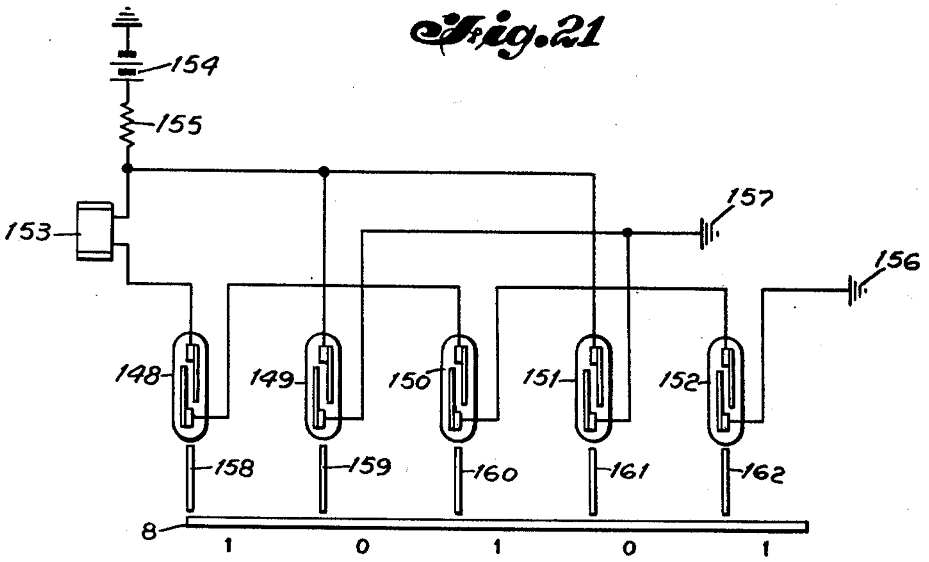
Figure 18:
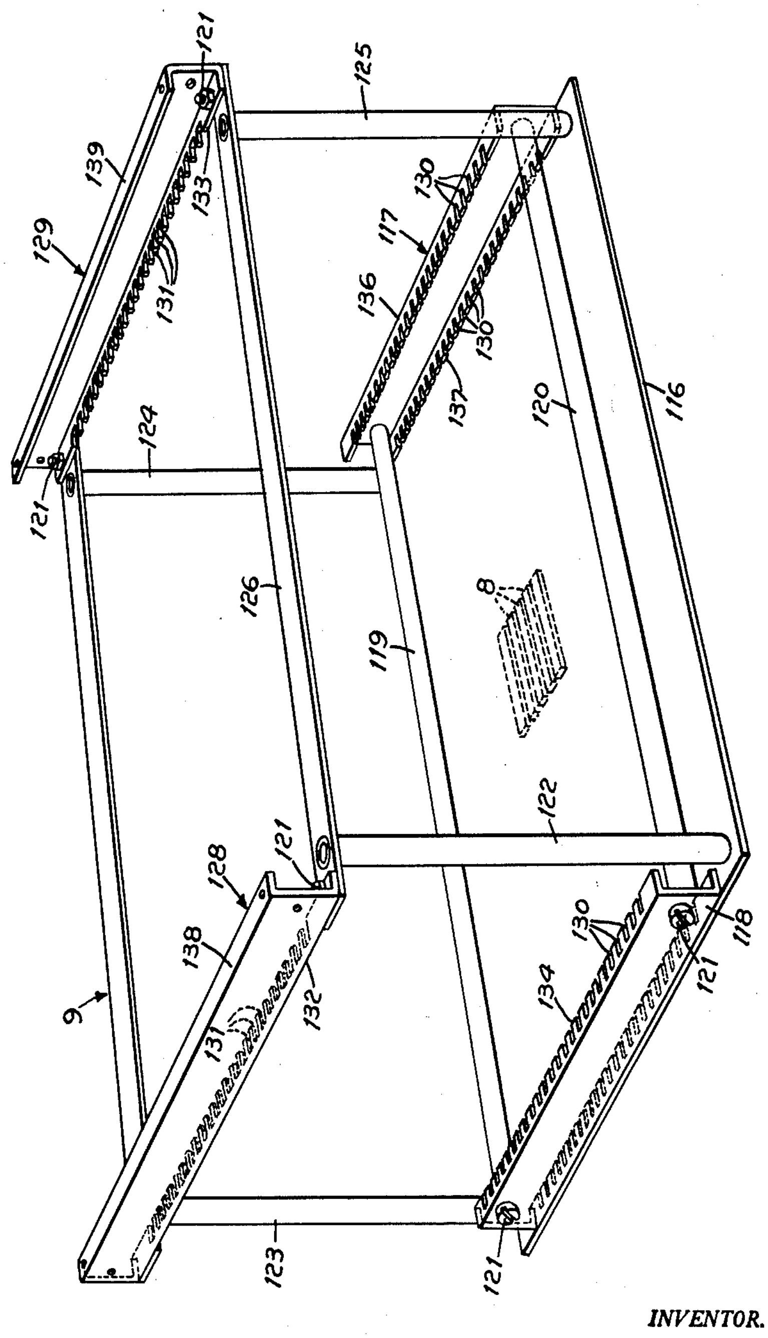
Figure 19:
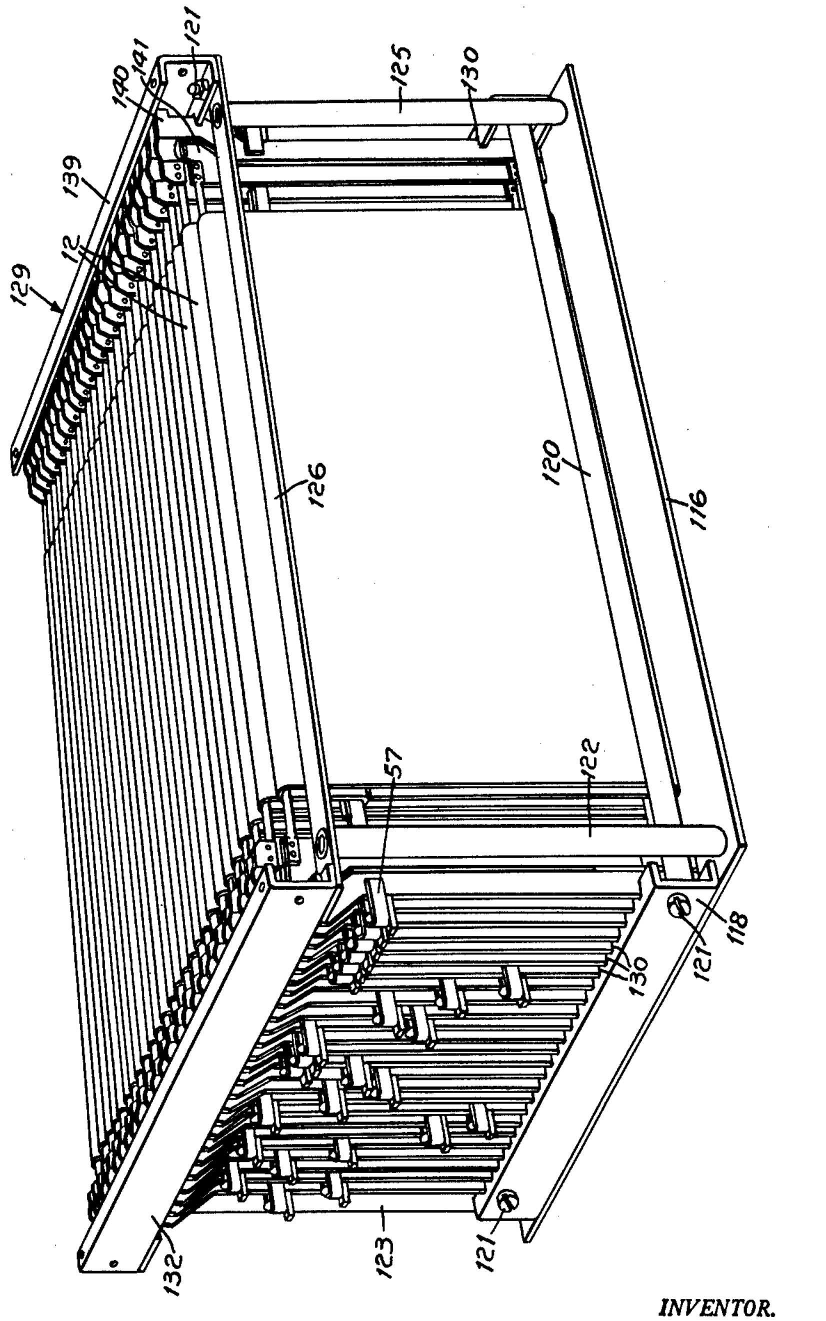

FIGURES 5*a* to 5*g* are sequential schematic cross-sectional views of my holding device illustrating its mode of operation through one complete cycle;

FIGURE 6 is a plan view of another embodiment of a holding device in accordance with my invention;

FIGURE 7 is a perspective view of a slotted endless belt in accordance with my invention;

FIGURE 8 is a side elevational view of a depth controlling means joining the endless belt of FIGURE 7;

FIGURE 9 is an isometric view of a positive ejecting means in accordance with my invention;

FIGURE 10 is a cross-sectional view of the holding device of FIGURE 6 taken along the lines 10—10;

FIGURE 11 is a partial plan elevation illustrating the cooperation of a positive ejecting means with a depth controlling means in accordance with my invention;

FIGURE 12 is an isometric view of a portion of the holding device of FIGURE 6;

FIGURE 13 is a perspective view of an inserting device in accordance with my invention;

FIGURE 14 is a cross-sectional view of the inserting device of FIGURE 15 taken along the lines 14—14;

FIGURE 15 is a plan view of an inserting device in accordance with my invention;

FIGURE 16 is a side elevational view of the inserting device of FIGURE 15;

FIGURE 17 is an isometric partially sectionalized schematic representation of a device for moving controlling means downward and/or upward;

FIGURE 18 is an isometric view of a tray for holding devices;

FIGURE 19 is an isometric view of the tray of FIGURE 18 containing holding devices;

FIGURE 20 is a schematic illustration of one of my methods for controlling an inserter wedge;

FIGURE 21 illustrates a comparator for comparing a sensed identification with a selected identification;

FIGURE 22 is a schematic representation of an embodiment of my ejecting means.

Figures 1, 2:
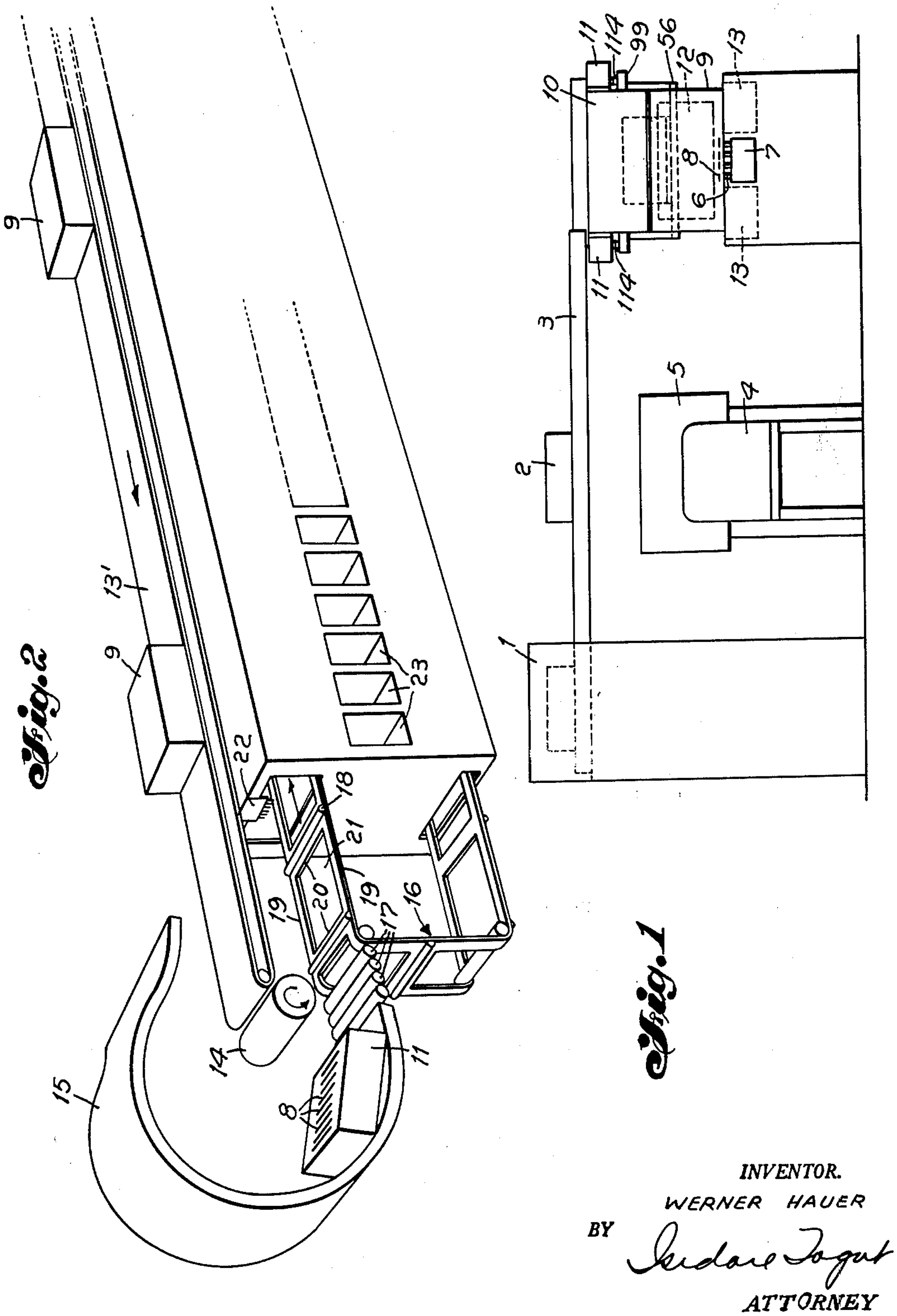
FIGURE 1 is a schematic representation of an off line station for encoding the identification of the articles to be sorted.
FIGURE 2 is a perspective view of a sorting machine in accordance with my invention.

Referring now to FIGURES 1 and 2 there is disclosed a mail sorting system in accordance with my invention. The mail is culled and faced before being fed to the input stacker 1 at the operator position shown in FIGURE 1. By means known to the prior art, the articles of mail 2 are taken off the input stacker and placed on the edgewise conveyor 3. The edgewise conveyor 3, transfers the mail in front of the operator position 4 so that the operator can read the destination of the mail article. The operator punches a code representing the destination of the mail article on the keyboard 5. The code representing the destination is magnetically encoded by means of write in heads 6 of an encoder 7 which either coerce the magnetic material of an encoding bar 8 attached to the bottom of a tray 9, at the position where the mail item is to be inserted, to saturation, a one, or do not coerce the material, a zero. The encoder 7 has as many write heads 6 as there are bits of 1 or 0 in the code used and is controlled by the keyboards by means known to the prior art. The operator then punches a key which causes the mail article 2 to be conveyed via the edgewise conveyor 3 into an inserter 10 and also causes a second mail article to be disposed in front of the operator position 4.

The punching of the key by the operator also causes devices 11 disposed on either side of inserter 10 to coact with the inserter 10 to move the mail article 2 in inserter 10 into a holding device 12 which is disposed in the tray 9 over the encoding bar 8. It is to be understood that the tray 9 is adapted to contain a plurality of holding devices and has the some number of encoding bars 8 on the bottom thereof, one encoding bar 8 for each holding device. The trays are on parallel conveyor belts 13 so that the write in heads are in close proximity to the encoding bars 8. After all the holding devices in the tray are filled with mail, the tray is then moved on to conveyor belt 13'.

The trays 9 containing the holding devices 12 are fed into the sorting machine of FIGURE 2 via the conveyor belt 13' over the roller 14 and strike the curved retaining wall 15. The retaining wall 15 causes the falling trays to assume an inverted position on the conveyor 16. The rollers 17 are caused to constantly revolve by means known to the prior art so that the trays 9 are forced rapidly onto the conveyor 16 till they are held by a stop 18. The tray rests on the lateral supports 19 and the end supports 20 over the hole 21 which is underneath all the holding devices in the tray so that letters can be ejected from them. The supporting members for the ends of the conveyors 13 and 16, the rollers 14 and 17, and the curved retaining wall 15 have been omitted for clarity. The trays are conveyed via the conveyor 16 past multiple sensing devices 22. Each sensing device 22 is associated with a bin 23 and a code representing the destination of articles of mail which that bin should contain. Although only one sensing device 22 is shown, it is to be understood that there is a similar sensing device for every bin 23. When a particular bin is the destination encoded on a coding bar, the comparator shown in FIGURE 20 associated with that particular bin senses the code coincidence through the read off heads of the sensing device and causes a relay to be activated which will cause the driving member of the holding device to be engaged with ejecting means (to be described later) which are associated with each bin and thus cause the mail article in the holding device associated with the coding bar sensed to be ejected into that particular bin. The bins are manually emptied during the sorting process to insure that there is adequate bin space for further mail articles.

Referring now to FIGURES 3 and 4 there is shown an embodiment of my holding and dispensing device. My invention comprises rectangular supporting frames 24 and 25 which are rigidly joined by the welds 26 and 27, though other means of fastening may be utilized if desired. The frames 24 and 25 are made from rods which provide smooth surfaces all around. By joining the two frames at 26 and 27 which are approximately at ⅕ of the overall length, a resilient construction is achieved whereby the two frames can be easily spread apart at the top. A depth controlling member 28 for the holding device is slidably mounted across the supporting frames 24 and 25 and is formed from a strip member 29 which runs across the full width of the frames 24 and 25 and extends beyond them. Fastened to the strip 29 are driver members 30 and a belt holding member 31. A virtual endless belt 32 is disposed about and within the supporting frames 24 and 25 to form a variable depth pocket 33 for holding mail or similar articles. One end 34 of the belt 32 is fastened in a suitable manner to the member 31. The belt is then wrapped around the head rod 25 and then around the tail rod 36. The belt is then passed through a slot 37 of the member 31 and is passed around the tail rod 38 and then around the head rod 39 and the other end 40 of the belt is fastened to the member 31. The depth controlling member 28 is thus effectively constrained to slidably move along the supporting rods 41, 42, 43, and 44 and the belt 32 moves about the head rods and the tail rods varying the depth of the pocket 33 in which the article 2' (FIGURE 4) is held. It can be noted that the movement of the depth controlling member 28 upwards will cause the portions of the belt within the frames to move upwards at the same rate of speed as the belt is rigidly held by the depth controlling member 28.

Figures 5A, 5B, 5C, 5D, 5E, 5F, 5G:
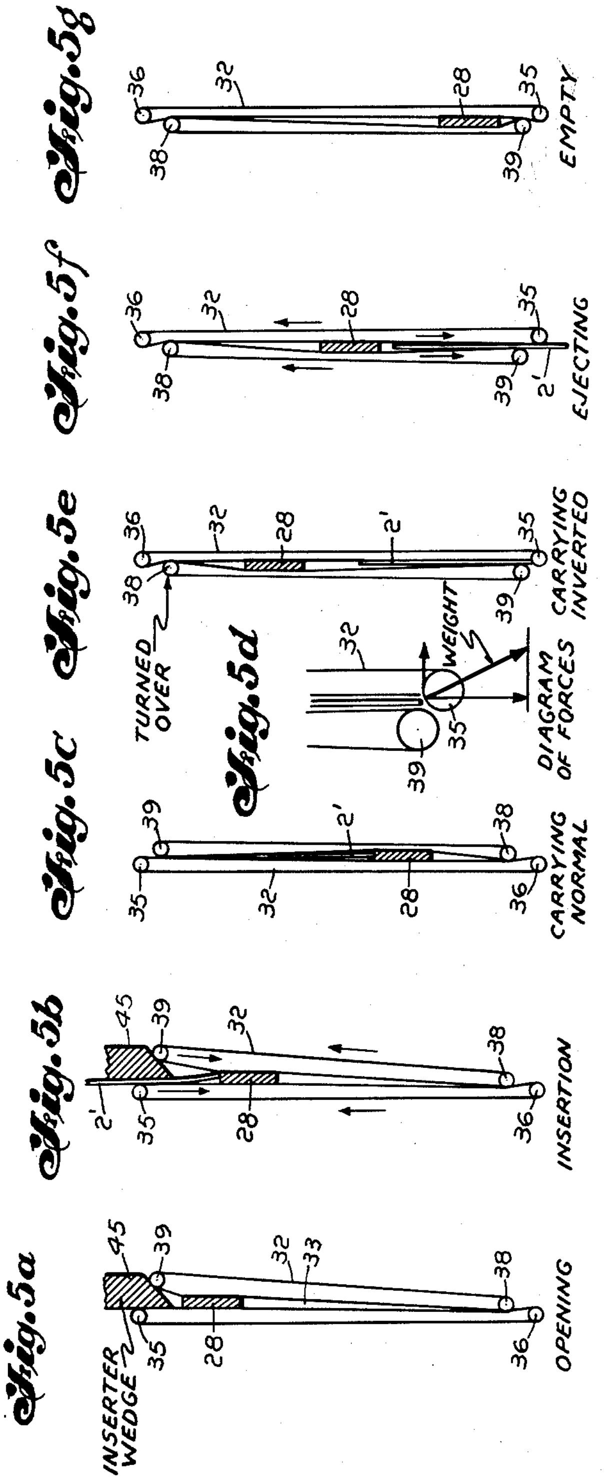

Referring now to FIGURES *5a* through *5g* the operation of the holding device through one complete operation is as follows: narrow inserter wedges 45 open the pocket 33 by separating the head rods 35 and 39 when inserted between them near their junctions with the supporting bars 41, 42, 43, and 44. The mail article 2' is inserted into the pocket formed by the belt. The depth controlling member 28 is moved from its position near the head bars (FIGURE 5*a*) to a position near the tail bars (FIGURE 5*c*). The movement of the belts is shown in FIGURE 5*b*. This causes the depth of the pocket 33 to increase, thus drawing the mail article into the pocket. There is no relative movement between the portions of the belt adjacent the mail article as it is sandwiched between those portions and the mail article moves with the belt. FIGURE 5*c* shows a mail article fully inserted into a holding device as it would be carried in the normal position of the holding device.

For the mail removal operation, the trays containing the devices would now be inverted thus inverting the holding devices. As can be seen in FIGURE 5*d*, the mail article 2′ will not fall out of the pockets as the head bars 35 and 39 are firmly pressed towards each other due to the spring action of the frames. Thus the head bar 39 presses against the belt 32 underneath the head bar bar 35 to seal the pocket. The spring action is limited by the strip 29 so that when the depth of the pocket is decreased, an article contained in the pocket will be ejected from the pocket and pass easily between the head bars as the movement of the walls tends to spread apart the head bars. It is to be noted that the horizontal component of the force due to the weight of the mail which tends to open the pocket is only a friction of the weight of the mail as the bulk of the force is vertical and is absorbed by the head bar 35.

When the mail article is to be dispensed, ejecting means (to be described later) cause the depth controlling member 28 to move toward its original position near the head bars. The sandwiched mail article is thereby forced out of the pocket. In dispensing the article there is again no relative movement between the article and the belt. Further, the movement of the belt tends to pull the head bars 35 and 39 apart thereby lessening the force required to move the mail out of the pocket.

Referring now to FIGURE 6 there is shown another embodiment of a holding device in accordance with my invention. The supporting members 46, 47, 48, and 49 are essentially leaf springs. They are rigidly connected to one another and to both of the tail bars 50 and 51 at the flanged base 52 of the supporting members 46 and 48 by the rivets 53. The supporting members 46 and 48 are rigidly connected at their tops to the head bar 54 by the rivets 53, and the supporting members 47 and 49 are rigidly connected to the head bar 55 by the rivets 53. A depth controlling member 56 is slidably mounted on the supporting members 46 and 48 for linear movement by means of the belt driving members 57 as will be explained with reference to FIGURE 12. The belt 58 is arranged over the head bars and under the tail bars and connected in a manner to be described with reference to FIGURE 10) to the depth controlling member 56, to form a pocket having a variable depth in the manner explained with reference to FIGURES 3 and 4. It can be seen that the supporting members 46 and 48 incorporate curved portions 59 to facilitate insertion of a wedge for separating the head bars. The wedge passes through the curved portion 59 and past the top portion 60 of the support member 46 and thereby spreads apart the head bars.

Refer now to FIGURES 7 and 8. In FIGURE 7, there is shown the endless belt 58 with the mating teeth 61. A depth controlling member 56 is threaded alternately through the ends 62 and 63 of the belt 58 so that the belt ends will overlap each other along their entire length. FIGURE 8 is a cross-sectional view of the depth controlling member 56 and the belt 58 through which the depth controlling member 56 has been threaded. As can be seen, the end 63 has a slot 64 which mates with the tooth 65 of the end 62. At the termination of the slot 64 in the end 63 there is a tooth 66 which encircles the depth controlling member 56 and the end 62 has a slot (hidden) which cooperates with the tooth 66.

FIGURE 9 shows a positive ejecting means 67 in accordance with my invention. It is composed of a corrugated strip of plastic material which has flaps 68 and tabs 71 protruding out of its base 69. The upper portion 70 of the positive ejecting means 67 due to its corrugated shape will press alternately against the opposed sides of the belt 58 when incorporated in the holding device, (FIGURE 10).

Referring now to FIGURE 10 which is a cross-sectional view taken along the lines 10—10 of FIGURE 6. The positive ejecting means 67 is incorporated into the holding device by disposing its upper portion 70 above the depth controlling member 56, its flaps 68 adjacent to the depth controlling member and below the ridge 72 of the depth controlling member, and its tabs 71 adjacent the opposite side of the depth controlling member 56 so that the positive ejecting means is forced to retain its wavy shape. When disposed in such a manner the curved portion 70 will press alternately against the opposed sides of the belt 58. The placing of the positive ejecting means 67 is accomplished by positioning the positive ejecting means within the belt end 62 with the flaps 68 below the ridge 72 and the tabs 71 on the opposite side of the depth controlling member. Note that the tabs 71 are always on the concave portion of the positive ejecting means as shown in FIGURE 9 and the flaps 68 are always on the convex portion. The flaps are arranged so that they now can be inserted between the teeth of the end 63 and the base 73 of the depth controlling member. The flaps are prestressed so that they can be easily bent to slide between the teeth and the base 73. The positive ejecting means are now securely and positively held due to the interaction of the belt 58, the base 73, the ridge 72, the flaps 68, the tabs 71, and the curved portion 70.

The positive ejecting means performs two functions. First, it prevents flat articles which are longer than a half wave of the corrugated strip from catching at 74 between the belt 58 and the depth controlling member 56. Therefore, the flat article 2′ rests on the positive ejecting means corrugated portion 70. Also the width of the upper portion is such that it will protrude out of the pocket 76 of the holding device when the pocket is at its minimum depth. Thus the least smallest article will be positively ejected from the pocket. The interaction of the flaps 68 of the ejection means and the depth controlling member 56 insures that the ejecting means itself will not fall out of the pocket.

FIGURE 11 discloses the cooperation of the positive ejecting means 67 with the depth controlling member 56. It can be seen that the wavy shape of the positive ejecting means causes the tabs to be on one side of the positive ejecting means and the flaps to be on the other side of the positive ejecting means and also that the positioning of the tabs and flaps cause the positive ejecting means to retain its wavy shape.

Referring now to FIGURE 12 there is illustrated an enlarged corner section of the holding device of FIGURE 6 without the belt 58. The depth controlling member 56 is readily connected to the supporting members 46 and 48 by the insertion of belt driving means 57 into the curved portions 77 at each of its ends. The narrow portion 78 of the belt driving means is inserted first and as it is inserted, the wide portion 79 provides a tight fit between the supporting bars and the depth controlling member. The flange portion 80 insures that the driver will not slip all the way through the curved portion 77 and also provides a good surface for driving the depth controlling member. The belt driving means 57 is made of a plastic which permits movement of the depth controlling member relative to the supporting members with very little friction. The belt driving means 57 can be permanently held by a rivet 81 or by a screw (not shown) which will allow its easy removal for repair purposes.

FIGURES 13, 14, 15, and 16 illustrate an embodiment of an inserting device in accordance with my invention.

Six bars 82, 83, 84, 85, 86, and 87 are rigidly connected to supporting frames 88 and 89. Two U-shaped frames 90 and 91 are hingedly connected to the supporting frames 88 and 89 at 92 and 93 respectively. The bars 94 and 95 form the bottom of the U-shaped frames 90 and 91 respectively.

An endless belt 96 is arranged to pass sequentially over the bar 82, under the bar 94, over the bar 83 and under the bar 84. Another endless belt 97 is sequentially arranged to pass over the bar 85, under the bar 95, over the bar 86 and under the bar 87. As can be seen in FIGURE 13, the portion of the belt 97 between the bars 85 and 95 and the portion of the belt 96 between the bars 82 and 94 form a V-shaped compartment 98. The bar 83 has a smaller diameter than the bar 82 and is placed below the bar 82 in a position which allows the endless belt 96 to move over the bars without interference. The bar 86 has a smaller diameter than the bar 85 and is placed in a position which allows the belt 97 to move without interference.

A belt controlling member 99 (FIG. 1) is slidably mounted on each of the belts 96 and 97 and about the supporting frames 88 and 89. The belt controlling member 99 consists of U-shaped sliding supports 100 and 101 which are mounted about the supporting frames 88 and 89 and belt connecting strips 102 and 103 which are rigidly attached to the U-shaped sliding supports 100 and 101 by the rivets 104. The belt connecting strips 102 are rigidly connected to the belt 96 at the portion of the belt between the bars 83 and 84 due to the pressure of rivets 104 at the strips extremities. The belt connecting strips 103 are rigidly connected in the same manner to the belt 97 at the portion of the belt between the bars 86 and 87. The distances between the bars 83 and 84, and the bars 86 and 87 are equal and are such that a belt moved along this distance will move a distance which is equivalent to the depth of holding devices which will be associated with this inserting device. It can be seen that a movement of the belt controlling means in a downward direction will cause the portions of the belts forming the walls of the compartment 98 to move in a downward direction, thus forcing any articles contained therein between the rods 94 and 95 and out of the compartment 98. This is so as the portions of the belts between the bars 86 and 87 and between the bars 83 and 84 which are connected to the belt controlling means will always move in the same directions as the portions of the belts which form the V-shaped compartment 98. The U-shaped frames 90 and 91 are resiliently held together by the spring clips 105 and 106. The rods 107 and 108 are movably connected to the sliding supports 101 and 100 respectively so that they are rotatable about the point of connection. At the end of each rod is a bracket 109.

In use, the inserting devices would be positioned above the trays of holding devices as can be seen in FIGURE 1. The punching of the key by the operator causes the devices 11 shown in FIGURES 1 and 17, which are disposed on either side of the inserter 10, to coact with the inserter to move the mail article 2 in the inserter into the associated holding device 12. The punching of the key causes a current to be pulsed through each of the identical time delay circuits 110 of the devices 11. These delay the pulses until after the letter has entered the inserting device 10. The pulses then pass through coils 111 simultaneously of the solenoids 112 causing the plungers 113 to move downward thus causing the extensions 114 of the plungers 113 to engage the belt controlling member 99 and move it downwards. Upon passage of the pulses the springs 115 bring the plungers back to their original positions. The device shown is also used to move the depth controlling member of a holding device downwards. When used to control the belt controlling member 99 of an inserting device as in this example, it is modified in that the extensions 114 are rigidly connected to the belt controlling member 99 and move it up to its original position when the springs move the plungers to their original positions. The movement of the belt controlling member causes the mail article 2 to be inserted into the holding device and also moves the coacting rods 107 and 108 which move the belt driving means 57 of the holding device downward so that the mail article is drawn into the holding device. The movement of the coacting rods also cause the holding device to be opened as will be explained with reference to FIGURE 20.

As the trays of holding devices pass underneath the inserting device, the brackets 109 engage the first set of belt driving members 30 and 57 associated with the first holding device in the tray which is to pass beneath the inserting device. As each holding device passes beneath an inserting device and its belt driving members engage the brackets 109, the belt controlling means 99 will be caused to move in a downward direction by the moving device 11. The brackets 109 are so shaped that they will engage and force the belt driving members 30 or 57 in a downward direction. Thus an article which is held in the inserting device will be forced out of the inserting device due to the movement of the belts 96 and 97 and will be drawn into the holding device due to the movement of its belt driving means in a downward direction causing the depth of the pocket of the holding device to be increased and thus draw the article to be inserted into the pocket.

Meanwhile the tray containing the holding device will move a certain minimum distance while the inserting device is in a fixed position. This movement will not interfere with the performance of the inserting device as the bars 94 and 95 forming the bottom of the V-shaped compartment will follow the holding device by swinging in an arc and the rods 107 and 108 will also swing in an arc while moving the belt driving means of the inserting device in a downward direction. This movement is limited; therefore, the speed of the conveyor is adjusted so that insertion of articles can be accomplished safely and smoothly. The "push" of the inserting device and the "pull" of the holding device causes rapid, positive insertion of the articles into the pockets of the holding devices. After an article has been fully inserted into the holding device, the belt controlling member is moved in an upward direction by the moving device 11, to its original position near the bars 83 and 86 and the rods 107 and 108 will swing to their original position so they can engage the belt driving means of the next holding device in the tray. Meanwhile another article will have been fed into the inserting device by means of the edgewise conveyor 3 and the device will be ready for another insertion.

The inserting device can always be accurately placed above the next holding device into which an article is to be inserted by proper adjustment of the speed of the conveyor belt upon which the trays of holding devices pass underneath the inserting device. Also it is possible to add an extension to the rods 107 and 108 which would coact with the U-shaped frames to swing the rods 94 and 95 above the head rods of the holding device that the brackets 109 engage.

FIGURES 18 and 19 illustrate a tray for article holding devices in accordance with my invention. In FIGURE 18, it can be seen that the tray 9 comprises a rectangular box shaped frame closed at one end by the baseboard 116. Mounted on and rigidly attached to the baseboard 116 are channel members 117 and 118 respectively. The channel members are rigidly attached to the lower lateral supports 119 and 120 by means of the screws 121. The lower ends of the corner supports 122, 123, 124, and 125 are rigidly attached to the baseboard 116 by screws (not shown). The upper ends of the corner supports 122 and 125 are rigidly connected to the upper lateral support 126 by the screws 121. The upper ends of the corner suports 123 and 124 are rigidly attached to the upper lateral support 127 by the screws 121. The upper end supports consisting of the channels 128 and 129 are rigidly connected to the upper lateral supports 126 and 127. All the lateral supports are both parallel to each other and perpendicular to all the end supports which are also parallel to each other. The corner supports are parallel to each other and perpendicular to the baseboard 116 and the lateral supports.

The channel members 117 and 118 have slots 130 which are approximately ⅛ inch in width. The channel members 128 and 129 have notches 131 of approximately ¼ inch width on their lower walls 132 and 133. The slots 130 in the upper wall 134 and in the lower wall 135 of the channel member 118 are disposed directly above each other. The slots 130 in the wall 136 and the wall 137 of the channel member 117 are also disposed directly above each other. The notches 131 in the wall 132 and in the wall 133 are disposed exactly opposite each other and exactly above the slots in the channel members 118 and 117 respectively. Therefore, it can be seen that a holding device perpendicular to the baseboard 116 and parallel to the lateral supports would rest in a set of four slots 130, one being in each wall 134, 135, 136, and 137 and in a slot 131 in the wall 132 and a slot 131 in the wall 133. There are no slots in walls 138 and 139. The holding device would be rigidly held at its base by the slots 130 and would rest on the baseboard 116. The holding device would be loosely held in the notches 131 and would rest on the walls 138 and 139 when the tray is in an inverted position. Associated with each set of slots 130 and each set of notches 131 in a parallel plane is a coding bar 8 which is rigidly attached to the baseboard 116. In order to put the holding devices in the tray or remove them, either of the channel members 138 or 139 is removed and then replaced after the holding devices have been inserted or removed.

Referring now to FIGURE 19 in which is shown the tray of FIGURE 17 containing 25 holding devices, 12 of the embodiments described in FIGURE 6, it can be seen that each device is held in four slots 130 and two notches 131 which are in a parallel plane perpendicular to the baseboard 116. When a holding device is to have an article inserted thereto, a wedge shaped member 45 (FIGURE 20) separates the head bars 140 and 141. The head bar 140 is rigidly pressed against one side of the notch 131. However, the shorter head bar 141 does not come in contact with the other side of the notch and will protrude into the area of the next slot, thereby pushing the head bar of the holding device in that slot forward an eighth of an inch. Therefore, even though each holding device utilizes a quarter of an inch of the length of the tray, each has an effective opening of three-eighths of an inch. It is this unique feature and the sandwiching of the devices in the tray which allows so complete a utilization of the conveyor belt. A tray containing 100 letters would be slightly over 25 inches long. Prior art devices within the same 25 inches would hold approximately 12 to 14 letters. Next it will be noted that the belt driving means 57 are free to move upwards and downwards along the complete length of the pockets. Therefore, the holding device, once it is in the tray, need not be removed and a letter can be inserted, removed, conveyed, and processed while contained in the tray. The holding devices can incorporate their own spacers consisting of projections of approximately one-eighth of an inch on their supporting bars which with the holding devices themselves would provide proper spacing and thus eliminate the need for the notches 131 in the trays.

Referring now to FIGURE 20 there is shown the interaction between the inserting device 10, the holding device 12, and the inserter wedge 45. In the particular embodiment shown, the movement of the rod 108 is restricted by the bearing 142 which also controls the wedge shaped member 45 by means of its extension 143 which rests on the rod 108 at 144. Other means may be used to control the movement of the wedge shaped member and thus leave the rod 108 free to move on its hinges. The apparatus functions as follows:

When a letter which is in the inserting device is to be inserted into the holding device, the belt controlling member of the inserting device 10 is moved downward by a moving device 11 thus moving the coacting rods 108 downward. The movement of the coacting rods 108 downward moves the depth controlling member 56 of the holding device 12 downward and also releases the inserter wedges 45 on either side of the holding devices which are forced downward by the springs 145 connected to the inserter wedges and to the supports 146. The movement of the supporting member 143 is controlled by the bearing 147 through which it extends. The inserter wedges spread the head bars 140 and 141. They travel a specified distance till they strike the stops 148′ which prevent them from travelling any further. After the letter has been inserted, the coacting rods 108 move upward and contact the supporting members 143 to move the inserter wedges 45 back to their original positions. In the embodiment shown, the tray with holding devices moves the distance of one holding device and then stops while an article is inserted into a holding device. Upon the completion of the insertion, the tray again moves forward the distance of one holding device.

In FIGURE 21 it can be seen that each comparator comprises five reed switches 148, 149, 150, 151, and 152. Each comparator is responsive to only one code. In the comparator shown the destination code contains five bits and is only responsive to the destination code 10101. In order for the relay 153 to operate it must receive a pulse from the battery 154 through the resistor 155. This can only be accomplished if there is a closed path to ground 156 and an open path to ground 157 so that the pulse does not short to ground 157. Since a 1 is shown by coercing the coding bar 8, all ones will exhibit a magnetic force and close reed switches which are sensed by the sensing heads associated with them. A sensed 0 is non-magnetic and will not close the reed switches. All ones are in series and zeros are in parallel as is shown. When the sensing heads 159 and 161 each sense a zero, the reed switches 149 and 151 will remain open. If the sensing heads 159 or 161 sense a one or ones the reed switch or switches associated with the sensing head or heads which sense the one or ones will be closed thus effectively shorting the battery to ground and the relay 153 will not operate. If the sensing heads 158, 160, or 162 sense a zero the reed switches 148, 150, or 152 associated with the sensing heads which sense the zero will not close and the relay will not operate. Thus it can be seen that the comparator will cause the relay to operate for only one particular code. When that particular code is sensed the operation of the relay will cause solenoids to move in the manner explained with reference to FIGURE 17 which will drive the driving means of a holding device downward.

FIGURE 22 is a schematic illustration of the functioning of my ejecting means during a complete cycle of operation. The cam members 163 shaped like inclined planes (hereinafter referred to as inclined planes 163) are rigidly connected to the means which support the conveyor 164 by means not shown. Trays 9, in the upside down condition are conveyed past code sensors 22′ on the conveying belt 164 having parallel ridges 18 for engaging the trays. Each code sensor is associated with a particular destination bin 23′ and a comparator having a particular code for that bin. When the code on a coding bar 8 attached to the tray 9 matches the sensor code, a driver 165 is energized by means such as is shown in FIGURE 17 which cause a deflector 166 (i.e. the plungers 113 of FIGURE 17) to move the particular belt driving member downward by engaging the belt driving means 167 of the holding device associated with the sensed coding bar and moving it downward. The advance of the conveyor engages the belt driving means with an inclined plane 163 which is associated with both the bin and the driver deflector energized.

Upon engagement with the inclined plane, the driver moves downward due to the shape of the plane as the tray moves forward. The articles of mail 2″ fall through the openings 21′ in the conveyor belt and impinge on the projection 168 of the selected bin 23′ and fall into it. This means of ejection requires that the belt driving means need only be partially operated to effect a selection. This is desired in a high-speed system in order to reduce the length of the conveyors or slowness of the conveyors required per system due to the slowness of the mechanical operations. A "residual" inclined plane 169 is also provided which is so shaped that it will empty all the pockets that have not been emptied beforehand.

Many systems can be devised in accordance with my invention. For example, it is possible to eliminate the trays entirely by rigidly attaching my holding devices to a chain conveyor and associating a coding bar with each holding device on the chain conveyor. The chain conveyor would carry the holding devices past sensing and ejecting means in the same manner as the trays. This type system can be advantageously used in check sorting or vending machine systems. In another system, my holding devices can, themselves, be ejected from the trays while containing the articles to be transported. Such a system would be especially useful in the handling of flat mail i.e. (magazines, newspapers) as it would produce a uniform size article for further handling purposes.

The holding devices can be incorporated into the trays themselves. The head bars can be resiliently mounted between the top lateral supports of a tray, i.e. by means of flat springs, and the tail bars can be rigidly attached between the bottom lateral supports of the tray. The incorporation of the holding devices as integral parts of the trays can be easily accomplished and would be more economical than separate holding devices and trays in a system which utilizes the holding devices only in the trays.

Subrouting is also possible in my systems. Subrouting is the transfer of mail from a holding device in one tray to a holding device in another tray in order to move the mail from one sorting area to another. For instance, the trays in the first area may only be fed past bins whose destinations are in New Jersey. Mail which is destined for New York would have to be transferred from these trays to trays in a system having New York as a destination. By passing the New Jersey tray in an upside down position over the New York tray, mail in the New Jersey tray can be ejected into the holding devices of the New York tray. The destination on the coding bar of the New Jersey tray with which a particular mail article is associated can be transferred to the coding bar on the New York tray associated with the holding device into which the mail article is inserted.

While I have described above the principles of my invention in connection with specific apparatus, it is to be clearly understood that this description is made only by way of example and not as a limitation to the scope of my invention, as set forth in the objects thereof and in the accompanying claims.

What is claimed is:

1. Handling means for an article sorting system comprising an article holding device having two movable walls disposed opposite one another, means for resiliently urging said walls toward one another, means for moving said walls, and means overlapping portions of said walls to form a closure at one end of said holding device, said closure and walls forming a pocket.

2. Handling means according to claim 1 further comprising means for carrying a plurality of said holding devices, said carrying means comprising trays, each said tray having means for holding said holding devices in fixed positions relative to said trays and openings for the insertion and ejection of articles from said holding devices during attachment to said trays.

3. Handling means according to claim 1 further comprising means for inserting articles into said pockets whereby the time required for insertion of said articles is independent of their size and weight.

4. Handling means according to claim 1 further comprising means for positively ejecting articles from said pockets whereby the time required for ejection of said articles is independent of their size and weight.

5. Handling means according to claim 2 further comprising identifying means, said identifying means comprising magnetically permeable coding bars rigidly attached to said trays whereby there is a coding bar corresponding to each fixed position of said holding devices.

6. Handling means according to claim 3 wherein said inserting means comprises inserting devices, each said inserting device comprising:

(*a*) two endless belts, (*b*) means for supporting said endless belts so that portions of the surfaces of said belts face each other to form flexible, movable walls of a V-shaped compartment and the portions of said belts forming the bottom of said V are resiliently pressed against each other, (*c*) and belt controlling means for moving said walls at an equal rate of movement.

7. Handling means according to claim 6 wherein each said holding device has a movable bottom and said moving means comprises depth controlling means for effecting movement of said bottom and said movable walls at an equal rate, and wherein each said belt controlling means comprises members for coacting with said depth controlling means whereby articles are simultaneously forced into and drawn into said pockets.

8. Handling means according to claim 7 wherein said depth controlling means comprises driving members and said coacting members comprise two bars oppositely disposed on said belt controlling means at its sides and the end of each said bar is shaped to engage said driving member and move said depth controlling means downward to increase the depth of said pocket when said belt controlling means moves downward.

9. A device for holding articles comprising:

(*a*) two parallel supporting members, (*b*) a depth controlling member slidably mounted on said supporting members, (*c*) means for resiliently holding said supporting members together, (*d*) and an endless belt connecting oppositely disposed portions of said supporting members, said endless belt being arranged to form a closed article holding pocket of variable depth to permit movement of an article in said pocket without relative motion between said article and said endless belt.

10. A device according to claim 9 wherein said endless belt has looped ends with cooperating slots therein so that said depth controlling member can be disposed within said slotted ends.

11. A device according to claim 10 further comprising means for ejecting said articles out of said holding pockets and ejecting means comprising a corrugated member disposed within the walls of said pocket and which protrudes out of said pocket when said pocket is at its minimum depth.

12. A device according to claim 9 wherein each of said parallel supporting members comprises a head bar and a tail bar which are connected by two connecting members so that said head bar and said tail bar are parallel to each other and both said head and tail bars are adjacent to and parallel to each other.

13. A holding device according to claim 12 wherein said head bars and tail bars are urged together in such a manner as to cause an overlapping, positive closure of the top and bottom of said pocket that is formed.

14. A tray for holding devices having variable depth pockets for receiving articles comprising means for holding the holding devices in fixed positions relative to said tray, means for allowing articles to be inserted into and removed from said holding devices without requiring the removal of the holding devices from said tray, and openings for varying the depth of the pockets from outside of said tray without requiring removal of said holding devices from said tray.

15. A tray according to claim 14 wherein said holding means comprise slots and notches into which the holding devices are inserted and held.

16. A tray according to claim 14 further comprising coding bars of magnetically permeable material upon which desired information relating to the articles held in said holding devices may be encoded.

17. An inserting device for inserting articles into holding devices comprising: two endless belts, means for supporting said endless belts so that surfaces of said endless belts face each other and form flexible, movable walls of a V-shaped compartment and the bottom of the compartment is movable relative to the top of the compartment, and moving means responsive to an external force for moving said walls at an equal rate of movement, said moving means comprising means fixedly attached to each of said endless belts and mounted on said supporting means for movement toward and away from the bottom of said V-shaped compartment.

18. An inserting device for inserting articles into holding devices having variable depth pockets comprising: two endless belts; means for supporting said endless belts causing surfaces of said endless belts to face each other forming flexible, movable walls of a V-shaped compartment so that the portions of said belts which form the bottom of said V are resiliently urged against each other; means for moving said walls; and means cooperating with said moving means and said holding devices to vary the depth of said variable depth pockets when said walls are moved so that the depth of said pockets are changed by an amount proportionate to the movement of said walls.

19. An inserting device for positioning and inserting articles into holding devices comprising:

(*a*) two parallel supporting frames;
(*b*) two endless belts;
(*c*) two equal U-shaped frames each of which is pivotably connected to both of said supporting frames;
(*d*) eight bars perpendicular to the supporting frames which form two symmetrical patterns of four bars in each pattern, three of said bars of each pattern fixedly connecting said supporting frames on opposite sides of said frames, wherein when said inserting device is in its normal operating position each pattern is formed by a first, second and third fixed bar, said third bar being wider than the other two and being positioned near the top of said supporting frames, said second bar being positioned adjacent and below said first bar in a position which permits one of said endless belts to run over said first and second bars without causing contact with itself, said third bar is positioned below said first and second bars and said belt is looped over said third bar, and the fourth bar of each pattern forms the bottom of said U-shaped frames;
(*e*) means for resiliently holding said U-shaped frames together;
(*f*) and a belt controlling member operating each of said endless belts in unison which is attached to each of said endless belts between the second and third bars of each pattern and guided by the supporting frames.

20. An article holding device comprising: two movable walls disposed opposite one another, means for resiliently urging said walls towards one another, means for moving said walls, and means overlapping portions of said walls to form a closure at one end of said holding device, said closure and walls forming a pocket.

21. An article holding device comprising: a bottom, two movable walls disposed opposite one another and cooperating with said bottom to form a pocket, means for resiliently urging said walls towards one another to hold articles in the formed pocket, and means for moving said walls at an equal rate whereby articles disposed between said walls are moved at said equal rate.

22. An article holding device comprising: a movable bottom; movable walls cooperating with said movable bottom to form an article holding compartment; and means for moving said bottom and said walls at an equal rate whereby articles held within said compartment are moved into or out of said compartment at said equal rate.

23. An article holding device comprising: a movable bottom; two movable walls disposed opposite one another and cooperating with said movable bottom to form a pocket, means for resiliently urging said walls twards one another, means overlapping portions of said walls to form a top for said pocket, and means for moving said walls and said bottom at an equal rate of movement.

References Cited in the file of this patent

UNITED STATES PATENTS

| | | |
|---|---|---|
| 1,978,193 | Fullmer | Oct. 23, 1934 |
| 2,416,398 | Marchand | Feb. 25, 1947 |
| 2,669,365 | Gourdon | Feb. 16, 1954 |
| 2,696,919 | Gourdon | Dec. 14, 1954 |
| 2,751,090 | Gourdon | June 19, 1956 |
| 2,751,092 | Gourdon | June 19, 1956 |
| 2,809,741 | Keilig | Oct. 15, 1957 |
| 2,812,079 | Carnine et al. | Nov. 5, 1957 |
| 2,863,574 | Henig | Dec. 9, 1958 |
| 2,988,209 | Parilla | June 13, 1961 |
| 3,035,695 | Buchwald et al. | May 22, 1962 |
| 3,081,867 | Corey | Mar. 19, 1963 |

FOREIGN PATENTS

| | | |
|---|---|---|
| 232,103 | Australia | Nov. 19, 1959 |
| 657,043 | Great Britain | Sept. 12, 1951 |